United States Patent Office 2,734,930
Patented Feb. 14, 1956

2,734,930

SEPARATION OF ETHYLBENZENE FROM CRUDE XYLENE FRACTIONS

Maurice J. Schlatter, El Cerrito, Calif., assignor to California Research Corporation, San Francisco, Calif., a corporation of Delaware No Drawing. Application March 17, 1951,
Serial No. 216,245

8 Claims. (Cl. 260—674)

This invention relates to a method for reducing the ethylbenzene content of crude xylene fractions.

Xylene fractions separated from the liquid hydrocarbon mixtures produced during the coking of coal or by catalytic reforming of naphtha commonly have a substantial content of ethylbenzene. The ethylbenzene contained in crude xylene fractions constitutes an undesirable impurity when it is attempted to separate individual isomers from the crude xylene fraction with any reasonable degree of efficiency. Furthermore, the ethylbenzene is a valuable material itself and ethylbenzene concentrates having an ethylbenzene content of 50% or more may be processed for styrene production.

It is an object of this invention to provide a method for separating crude xylenes into two fractions, one fraction having a reduced ethylbenzene content and the other fraction having an increased ethylbenzene content.

It has been found that ethylbenzene may be separated from crude xylene fractions by contacting the crude xylene fraction with a material of the group consisting of tertiary-alkylating agents, tertiary-alkyl benzenes including mono- and di-tertiary-alkyl benzenes, tertiary-alkyl toluenes including mono- and di-tertiary-alkyl toluenes, and tertiary-alkyl xylenes in the presence of an alkylation catalyst under alkylating conditions and fractionally distilling the reaction product to separate a fraction comprising unreacted xylenes and a fraction comprising tertiary-alkylethylbenzene. The amount of the tertiary-alkylating agent, tertiary-alkylbenzene, etc. which is employed in the reaction is preferably substantially less on a molar basis than the combined xylene and ethylbenzene contents of the crude xylene fraction.

The rate at which ethylbenzene is alkylated by a tertiary-alkylating agent and the rate at which a tertiary-alkyl group is transferred from such a material as tertiary-alkylbenzene to ethylbenzene are both much more rapid than the rates at which the xylenes are alkylated with a tertiary-alkylating agent, or at which a tertiary-alkyl group is transferred from a material such as tertiary-alkylbenzene to xylenes.

The term "tertiary-alkylating agent" is employed herein to indicate an alkylating agent containing a tertiary carbon atom having no hydrogen atom bonded to it. Suitable tertiary-alkylating agents for use in the process of the invention include tertiary-olefins, tertiary-alcohols, tertiary-alkyl chlorides, and the corresponding tertiary-cycloalkyl derivatives. Of the numerous tertiary-alkylating agents available, it is preferred to employ those which introduce a tertiary-butyl group into the material undergoing alkylation, for example, isobutene, tertiary-butyl alcohol, tertiary-butyl chloride, tertiary-butyl mercaptan, and di-isobutylene. Tertiary-alkylating agents of higher molecular weight such as the $C_5$ to $C_7$ tertiary-olefins, tertiary-alcohols and tertiary-alkyl chlorides may be employed. Also, tertiary-cycloalkyl derivatives such as 1-methylcyclohexene, 1-chloro-1-methylcyclopentane and 1-ethylcyclopentanol may be employed. The tertiary-alkylbenzenes, tertiary-alkyltoluenes, and tertiary-alkylxylenes which may be contacted with crude xylene fractions to effect transfer of the tertiary-alkyl group from these materials to ethylbenzene are, respectively, benzene, toluene, phenol or xylene alkylated with one of the above tertiary-alkylating agents.

The ethylbenzene contents of crude xylene feeds which may be processed pursuant to this invention vary from about 8 to about 25% by volume. Other concentrations may be processed, but feed composition usually is in this range. When a naphthenic hydrocarbon fraction is subjected to hydroforming under the usual commercial conditions, the reaction product may be distilled to separate a xylene-rich fraction boiling from about 275° F. to 300° F. This fraction has a total $C_8$ aromatic content of about 60% and contains from 8 to 10% of ethylbenzene. This xylene fraction may be enriched in respect to both xylene and ethylbenzene content by subjecting it to a second hydroforming treatment which dehydrogenates naphthenes and cyclizes paraffins to increase the total aromatic content of the 275 to 300° F. fraction to about 90%. This second pass xylene fraction may be fractionally distilled to separate ortho-xylene and the degree of reduction in the ortho-xylene content of the fraction is largely determined by the efficiency of the fractionating equipment. Coal tar xylenes are commercially available in several grades, all of which have appreciable ethylbenzene contents. Exemplary analyses of several commercially available xylene fractions are set out in the following Table I. Any of these materials may be treated pursuant to the process of the invention to produce a xylene fraction substantially free of ethylbenzene.

TABLE I

|   | Hydroformer, 1st Pass 275–300° F. | Hydroformer, 2nd Pass 275–300° F. | 2nd Pass Distilled | Coal Tar, Crude | Coal Tar, 10° Boiling Range |
|---|---|---|---|---|---|
| Ortho-xylene | 14.5 | 20 | 9 | 21 | 13.7 |
| Meta-xylene | 26 | 41 | 42 | 45 | 42 |
| Para-xylene | 9.5 | 15 | 17 | 16.3 | 25 |
| Ethylbenzene | 8 | 16 | 19.5 | 17.8 | 16.8 |
| Paraffin-naphthene | 42 | 8 | 12 | 2 | 2 |

Crude xylenes having compositions shown in the above Table I and other crude xylenes having an appreciable ethylbenzene content may be alkylated with a tertiary-alkylating agent or equilibrated with tertiary-alkylbenzenes, tertiary-alkyltoluenes or tertiary-alkylxylenes to selectively convert the ethylbenzene to tertiary-alkylethylbenzene. The equilibrium may be displaced by distilling off the lower boiling benzene or toluene when tertiary-alkyl derivatives of these materials are used. These reactions are conducted by contacting the crude xylene with the tertiary-alkylating agent, tertiary-alkylbenzene, tertiary-alkyltoluene, or tertiary-alkylxylene in the presence of a conventional alkylation catalyst under conventional alkylating conditions and then fractionally distilling the reaction product mixture to separate a xylene fraction overhead and a bottoms fraction comprising tertiary-alkylethylbenzene.

Catalysts or condensing agents which can be used in the alkylating step include hydrofluoric acid, phophoric acid, sulfuric acid, Friedel-Crafts catalysts such as zinc chloride, aluminum chloride, ferric chloride, boron fluoride, and the like, and complexes of Friedel-Crafts catalysts with organic polar liquids such as nitrobenzene, chloroform and nitromethane.

The alkylation reactions or equilibrations are usually best conducted at temperatures in the range about minus 10° C. to plus 100° C., though the optimum temperatures for different catalysts differ and, in the case of some catalysts, may be considerably above 100° C.

Following the alkylation and distillation, the tertiary-alkyl group can be removed from the tertiary-alkylethylbenzene, and ethylbenzene may be recovered as such. The removal of the tertiary-alkyl group is accomplished by subjecting the tertiary-alkylethylbenzene to conventional dealkylation treatments which selectively remove the tertiary-alkyl group, or by equilibrating the tertiary-alkylethylbenzene with materials such as benzene, toluene, phenol or ortho- or meta-xylene in the presence of an alkylation catalyst under conventional alkylating conditions.

The tertiary-alkyl group may be selectively removed from tertiary-alkylethylbenzenes by contacting these materials with a dealkylation catalyst such as the materials of group VI and group VIII of the periodic table, or with a catalytic cracking catalyst such as silica-alumina, magnesia-alumina, alumina or clay under catalytic cracking conditions at temperatures in the range about 250 to 500° C. The tertiary-alkyl groups, especially the tertiary-butyl group, are much more readily removed from the benzene ring than the other alkyl groups.

When tertiary-alkylethylbenzenes are mixed with benzene, toluene, ortho-xylene, phenol or meta-xylene and the mixture is contacted with an alkylation catalyst under alkylating conditions, the tertiary-alkyl group is transferred from its position on the ring of the tertiary-alkylethylbenzene to the acceptor molecules.

Where either of the above-described methods of removing the tertiary-alkyl group from tertiary-alkylethylbenzene is employed, ethylbenzene is readily recovered from the reaction product mixture by fractional distillation.

The following examples illustrate the removal of ethylbenzene from crude xylene fractions pursuant to the process of the invention.

*Example 1*

Isobutene (394 g.) was dissolved in 1000 g. of a $C_8$-hydrocarbon mixture at 0° C. This was then added slowly to 182 g. of liquid hydrogen fluoride which was vigorously stirred in a copper flask. The temperature was maintained at 0–5° C. during the two-hour period required for the addition, stirring and cooling were continued for an additional two hours, and the reaction mixture then poured on crushed ice. The acid was neutralized with excess sodium hydroxide and the organic layer separated from the aqueous phase and solid sodium fluoride, washed with three 200 ml. portions of water, dried over calcium chloride, and filtered. The weight of the crude reaction product was 1308 g.

The product was analyzed by fractional distillation through a 30 plate column and the $C_8$-hydrocarbon fraction (B. P. 135–145° C.) analyzed by an ultraviolet spectrometric method. The tertiary-butyl $C_8$ aromatic hydrocarbon fraction distilled in the range 207–214° C. The analytical results are presented in Table II.

*Example 2*

The $C_8$-hydrocarbon mixture (200 g.) and 200 g. of 88% sulfuric acid were heated to 40° C. in a "turbo-reactor" and 141 g. of di-isobutylene added over a period of 40 minutes, maintaining the temperature at 40–47° C. Stirring was continued at this temperature for 4 hours. The sulfuric acid layer (257.6 g.) was drawn off and the organic layer (280.3 g.) refluxed with 200 ml. of 15% sodium hydroxide solution for 45 minutes. The mixture was allowed to stand overnight, was separated, washed with 200 ml. of water, dried, and distilled through a 30 plate column.

The results of the distillation analysis and ultraviolet spectrometric analysis of the $C_8$-hydrocarbon fraction are presented in Table II. The increase in weight of the sulfuric acid phase is reported as recovered alkylating agent.

*Example 3*

A portion (100 g.) of the $C_8$-hydrocarbon mixture (total weight 200 g.) was shaken with 14.6 g. of nitroethane and 22.3 g. of aluminum chloride until less than 0.5 g. of solid remained undissolved. The rest of the $C_8$-hydrocarbon was added and the mixture transferred to a flask containing 248 g. of tertiary-butyltoluenes (mainly paraisomer). This flask was equipped with capillary, thermometer, and an 18 inch x ¾ inch vacuum jacketed column filled with ⅛ inch glass helicies. The total condensation head and water jacketed receiver were cooled with ice water and connected to a vacuum system through a "Dry Ice" cooled cold trap.

The pressure was reduced to 20 mm. and the mixture heated gradually to 55° C. over a period of 5 hours (5 hours at 43–55° C.). A total of 107.4 g. was collected in the receiver and cold trap. The product in the reactor was separated from 6.5 g. of black, viscous tar, shaken with 100 ml. of 6 N hydrochloric acid, two 50 ml. portions of 6 N sodium hydroxide (to remove nitroethane), and 50 ml. of water. The crude product weighed 321.2 g.

The results of the distillation of the hydrocarbon products from the reaction and ultraviolet spectrometric analysis of the $C_8$-hydrocarbon fraction are shown in Table II.

TABLE II

|  | Run 141-211 | Wt. (g.) | Run 653-33 | Wt. (g.) | Run 653-14 | Wt. (g.) |
|---|---|---|---|---|---|---|
| Reactants: |  |  |  |  |  |  |
| $C_8$-Hydrocarbons |  | 1,000 |  | 200 |  | 200 |
| Ethylbenzene | 14.0 Vol. percent |  | 10.5 Vol. percent |  | 10.5 Vol. percent |  |
| Ortho-xylene | 7.6 Vol. percent |  | 10.7 Vol. percent |  | 10.7 Vol. percent |  |
| Meta-xylene | 47.9 Vol. percent |  | 57.2 Vol. percent |  | 57.2 Vol. percent |  |
| Para-xylene | 18.2 Vol. percent |  | 18.3 Vol. percent |  | 18.3 Vol. percent |  |
| Paraffins | 12.3 Vol. percent |  | 3.3 Vol. percent |  | 3.3 Vol. percent |  |
| Alkylating Agent | Isobutene | 374 | Diisobutylene | 141 | Tert-butyl-toluenes | 248 |
| Catalyst | HF | 182 | 88% $H_2SO_4$ | 200 | Complex of: AlCl$_3$ / Nitroethane | 22.3 / 14.6 |
| Conditions: |  |  |  |  |  |  |
| Temperature range, ° C | 0–5 |  | 40–47 |  | 43–55 |  |
| Total reaction time, Hrs | 4.0 |  | 5.0 |  | 5.0 |  |
| Product: |  |  |  |  |  |  |
| Weight of total crude |  | 1,308 |  | 311 | 435.1 | 435.1 |
| Distillation Analysis— |  |  |  |  |  |  |
| Recovered alkylating agent |  |  |  | 57.6 |  | 66.8 |
| Toluene |  |  |  |  |  | 93.4 |
| $C_8$-Hydrocarbons |  | 327.3 |  | 82.7 |  | 96.1 |
| tert-butyl-$C_8$-aromatics |  | 819.9 |  | 73.0 |  | 105.9 |
| High-boiling products |  | 160.8 |  | 79.7 |  | [1] 57.8 |
| Other products |  |  |  | [1] 18.0 |  | [2] 20.5 |
| Analysis of $C_8$-Hydrocarbons: |  |  |  |  |  |  |
| Ethylbenzene | 2.5 Vol. Percent |  | 0 Vol. Percent |  | 1.2 Vol. Percent |  |
| Ortho-xylene | 2.2 Vol. Percent |  | 3.6 Vol. Percent |  | 7.4 Vol. Percent |  |
| Meta-xylene | 20.8 Vol. Percent |  | 51.9 Vol. Percent |  | 49.9 Vol. Percent |  |
| Para-xylene | 48.1 Vol. Percent |  | 34.9 Vol. Percent |  | 33.0 Vol. Percent |  |
| Paraffins | 26.4 Vol. Percent |  | 9.6 Vol. Percent |  | 8.5 Vol. Percent |  |

[1] Product boiling largely at 170° C.
[2] This fraction contains 36.7 g. di-tertiarybutyl toluene.
[3] Largely isobutene.

From the data presented in the above table it is clear that ethylbenzene is selectively and effectively removed from crude xylenes by contacting the crude xylene with tertiary-alkylating agents or tertiary-alkyl aromatic hydrocarbons in the presence of conventional alkylating catalysts under conventional alkylating conditions. It will be noted that the alkylatable aromatic hydrocarbons in the C8-aromatic fractions are in molar excess uct (1043 g.) was dried over calcium chloride and fractionally distilled through a 70 cm. x 14 mm. column packed with glass helices. The results of the analytical distillation are given in Table III, together with analysis of the C8-aromatic hydrogen fraction.

The other runs were carried out in a similar manner except that the distillations were made using a small concentric tube column.

TABLE III

| Run No. | A | B | C |
|---|---|---|---|
| Reactants: | | | |
| tert-Butyl-C8-Aromatic Hydrocarbons— | | | |
| Boiling range, °C | 206.0–207.8 | 207.8–213.9 | 213.9–214.8. |
| Weight, g | 169 (1.04 mole) | 24.0 (0.148 mole) | 16.0 (0.099 mole). |
| Benzene, g | 913 (11.7 moles) | 173 (2.22 moles) | 116 (1.48 moles). |
| Hydrogen Fluoride, g | 170 (8.5 moles) | 60 (3.0 moles) | 64 (3.2 moles). |
| Conditions: | | | |
| Temperature, °C | 0–5 | 0–5 | 0–5. |
| Time, hrs | 5 | 4 | 4. |
| Conversion (Approx.), Percent | 50 | 60 | 80. |
| Product: | | | |
| Crude hydrocarbon product, g | 1,042.7 | 180.0 | 85.9. |
| Recovery, Percent | 96 | 92 | 65. |
| Benzene, g | 832.0 | 150.8 | 65.4. |
| C8-Hydrocarbons, g | 59.7 | 9.0 | 8.8. |
| Analysis (Ultraviolet Spectra)— | | | |
| Ethylbenzene, Vol. Percent | 0 | 23.8 | 35.4. |
| Ortho-xylene, Vol. Percent | 1.5 | 29.0 | 62.0. |
| Meta-xylene, Vol. Percent | 97.5 | 47.1 | 2.3. |
| Para-xylene, Vol. Percent | 0 | 0 | 0.3. |
| Paraffins, Vol. Percent | 1.0 | 0.1 | 0. |
| tert-Butylbenzene, g | 67.1 | 11.7 | 9.0. |
| tert-Butyl-C8-Aromatic Hydrocarbons, g | 80.9 | }8.5 | 2.7. |
| High Boiling Products | 3.0 | | |
| Refractive Index of C8-Fraction, $n_D^{20}$ | 1.4972 | 1.4987 | 1.5012. |
| Calculated from Analysis, $n_D^{20}$ | 1.4974 | 1.4992 | 1.5016. | over the tertiary-alkylating agents employed pursuant to the preferred method of practicing the invention.

The tertiary-butyl group may be removed from the tertiary-butyl C8-aromatic fractions shown in the above table by contacting these fractions with benzene, toluene, or ortho- or meta-xylene in the presence of an alkylation catalyst under alkylating conditions. By this means the tertiary-butyl group is displaced from the tertiary-butyl C8-aromatics, particularly from the tertiary-butyl-ethylbenzene, and a C8-hydrocarbon fraction having a high ethylbenzene content may be recovered from the reaction product by fractional distillation. The following example specifically illustrates the removal of the tertiary-butyl group from the tertiary-butyl-C8-aromatics and the overall result achieved in the specific example can be substantially duplicated where the other tertiary-alkyl groups described above are attached to the C8-aromatic hydrocarbons.

*Example 4*

The tertiary-butyl-C8-aromatic hydrocarbon fractions used in these dealkylation experiments were obtained by fractional distillation of the products from typical tertiary-butylations of crude xylenes obtained by catalytically reforming naphthene stocks. The fraction treated in run A consisted largely of 1,3-dimethyl-5-tertiary-butylbenzene, while fractions treated in runs B and C contain para-tertiary-butylethylbenzene.

The following example will serve to illustrate the experimental procedure followed in the runs tabulated in the table.

*Run A.*—A mixture containing 169 g. of tertiary-butyl-C8-aromatic hydrocarbons (1.04 moles) distilling from 206.0–207.8° C. at 760 mm. pressure and 913 g. of benzene (11.7 moles) was added over a period of 15 minutes to 170 g. of liquid anhydrous hydrogen fluoride contained in a copper flask equipped with stainless-steel stirrer, addition tube and gas outlet. The flask was partially immersed in an ice bath. Stirring was continued for 5 hours after addition was complete and the reaction mixture then poured on crushed ice. The acid was neutralized with excess potassium hydroxide, and the organic layer separated. The crude prod- Obviously, many modifications and variations of the invention as hereinbefore set forth may be made without departing from the spirit and scope thereof, and only such limitations should be imposed as are indicated in the appended claims.

I claim:

1. The method of removing ethylbenzene from a crude xylene fraction containing ethylbenzene, which comprises selectively alkylating the ethylbenzene by contacting the crude xylene fraction with a quantity of a material of the group consisting of tertiary-alkylating agents, tertiary-alkylbenzenes, tertiary-alkyltoluenes and tertiary-alkylxylenes sufficient to selectively alkylate the major proportion of the ethylbenzene in said fraction in the presence of an alkylation catalyst under alkylating conditions and fractionally distilling the reaction product to separate an overhead fraction comprising unreacted xylenes and characterized by a proportion of ethylbenzene lesser than the proportion of ethylbenzene in the crude xylene fraction and a bottoms fraction rich in tertiary-alkylethylbenzene.

2. The method of removing ethylbenzene from a crude xylene fraction containing the three xylene isomers and ethylbenzene, which comprises fractionally distilling the crude xylene to separate an overhead fraction having a reduced ortho-xylene content and a bottoms fraction rich in ortho-xylene, selectively alkylating the ethylbenzene contained in the overhead fraction by contacting the overhead fraction with a quantity of a material of the group consisting of tertiary-alkylating agents, tertiary-alkylbenzenes, tertiary-alkyltoluenes and tertiary-alkylxylenes sufficient to selectively alkylate the major proportion of the ethylbenzene in the overhead fraction in the presence of an alkylation catalyst under alkylating conditions, and fractionally distilling the reaction product to separate an overhead fraction comprising unreacted xylenes and characterized by a proprotion of ethylbenzene lesser than the proportion of ethylbenzene in the first-mentioned overhead fraction and a fraction rich in tertiary-alkylethylbenzene.

3. The method of removing an ethylbenzene rich fraction from a crude xylene fraction containing ethylbenzene, which comprises selectively alkylating the ethylbenzene by contacting the crude xylene fraction with a quantity of a material of the group consisting of tertiary-alkylating agents, tertiary-alkylbenzenes, tertiary-alkyltoluenes and tertiary-alkylxylenes sufficient to selectively alkylate the major proportion of the ethylbenzene in the crude xylene fraction in the presence of an alkylation catalyst under alkylating conditions, fractionally distilling the reaction product to separate an overhead fraction comprising unreacted xylenes and characterized by a proportion of ethylbenzene lesser than the proportion of ethylbenzene in the crude xylene fraction and a fraction rich in tertiary-alkylethylbenzene and removing the tertiary-alkyl group from the tertiary-alkylethylbenzene.

4. The method of removing an ethylbenzene rich fraction from a crude xylene fraction containing ethylbenzene, which comprises selectively alkylating the ethylbenzene by contacting the crude xylene fraction with a quantity of a material of the group consisting of tertiary-alkylating agents, tertiary-alkylbenzenes, tertiary-alkyltoluenes and tertiary-alkylxylenes sufficient to selectively alkylate the major proportion of the ethylbenzene in said crude xylene fraction in the presence of an alkylation catalyst under alkylating condtions, fractionally distilling the reaction product to separate an overhead fraction comprising unreacted xylenes and characterized by a proportion of ethylbenzene lesser than the proportion of ethylbenzene in the crude xylene fraction and a fraction rich in tertiary-alkylethylbenzene and contacting the tertiary-alkylethylbenzene rich fraction with a catalytic cracking catalyst under catalytic cracking conditions to remove the tertiary-alkyl group.

5. The method of removing an ethylbenzene rich fraction from a crude xylene fraction containing ethylbenzene, which comprises selectively alkylating the ethylbenzene by contacting the crude xylene fraction with a quantity of a material of the group consisting of tertiary-alkylating agents, tertiary-alkylbenzenes, tertiary-alkyltoluenes and tertiary-alkylxylenes sufficient to selectively alkylate the major proportion of the ethylbenzene in the crude xylene fraction in the presene of an alkylation catalyst under alkylating conditions, fractionally distilling the reaction product to recover an overhead fraction comprising unreacted xylenes and characterized by a proportion of ethylbenzene lesser than the proportion of ethylbenzene in the crude xylene fraction and a bottoms fraction rich in tertiary-alkyl ethylbenzene, contacting the fraction rich in tertiary-alkylethylbenzene with a material of the group consisting of benzene, toluene, ortho-xylene, meta-xylene, and phenol in the presence of an alkylation catalyst under alkylating conditions and fractionally distilling the reaction product to separate an overhead fraction rich in ethylbenzene.

6. The method of removing ethylbenzene from xylene fractions containing ethylbenzene which comprises contacting the xylene fraction with a quantity of at least one material of the group consisting of tertiary alkylating agents, tertiary alkylbenzenes, tertiary alkyl xylenes and tertiary alkyl toluenes sufficient to selectively alkylate the major proportion of the ethylbenzene in said xylene fraction in the presence of an alkylation catalyst under alkylating conditions, and fractionally distilling the reaction product to separate an overhead fraction comprising xylenes and characterized by a proportion of ethylbenzene lesser than the proportion of ethylbenzene in said xylene fraction and a bottoms fraction rich in tertiary alkyl ethylbenzene.

7. Process for treating a mixture consisting essentially of ethyl benzene, ortho-xylene, meta-xylene, and para-xylene to produce a xylene fraction characterized by a proportion of ethyl benzene lesser than the proportion of ethyl benzene in said mixture, which comprises subjecting said mixture in liquid phase to alkylating conditions in contact with an alkylation catalyst and a quantity of an alkylating agent having at least one tertiary carbon atom so that the number of moles of alkylating agent is sufficient to selectively alkylate the major proportion of the ethylbenzene in said mixture and fractionally distilling the reaction mixture to produce a xylene fraction characterized by a proportion of ethyl benzene lesser than the proportion of ethyl benzene in said mixture.

8. Process for treating a mixture consisting essentially of ethyl benzene, ortho xylene, meta xylene, and para xylene to produce a xylene fraction characterized by a proportion of ethyl benzene lesser than the proportion of ethyl benzene in said mixture, which comprises subjecting said mixture in liquid phase to alkylating conditions in contact with an alkylation catalyst and a quantity of an alkylating agent having at least one tertiary carbon atom sufficient to selectively alkylate the major proportion of the ethyl benzene in said mixture, and fractionally distilling the reaction product to produce a xylene fraction characterized by a proportion of ethyl benzene lesser than the proportion of ethyl benzene in said mixture.

References Cited in the file of this patent

UNITED STATES PATENTS

| | | |
|---|---|---|
| 412,545 | Schnaufer et al. | Oct. 8, 1889 |
| 2,282,231 | Mattox | May 5, 1942 |
| 2,385,524 | Mattox | Sept. 25, 1945 |

OTHER REFERENCES

Nightingale et al.: Jour. Amer. Chem. Soc., vol. 64, pages 1662–5 (1942).